United States Patent [19]

Kittle et al.

[11] Patent Number: 4,951,775
[45] Date of Patent: Aug. 28, 1990

[54] FRONT WHEEL DRIVE CLUTCH CONTROL SYSTEM

[75] Inventors: Carl E. Kittle, Cedar Falls; Daniel J. Harken, Waterloo; Seaton Moon, Cedar Falls, all of Iowa

[73] Assignee: Deere & Company, Moline, Ill.

[21] Appl. No.: 374,723

[22] Filed: Jul. 3, 1989

[51] Int. Cl.⁵ .............................................. B60K 23/08
[52] U.S. Cl. ................................... 180/244; 180/247; 192/4 A; 192/13 A
[58] Field of Search ............... 180/233, 244, 247, 248; 192/4 R, 4 A, 13 R, 13 A

[56] References Cited

U.S. PATENT DOCUMENTS 4,811,811  3/1989  Bergene .............................. 180/244
4,878,559  11/1989  Moon et al. ......................... 180/244

Primary Examiner—Mitchell J. Hill

[57] ABSTRACT

A clutch control system for the front wheel drive clutch of a four-wheel drive vehicle engages the front wheel drive clutch as a function of three brake-operated switches, a pair of manually-operated "OFF-ON-AUTO" mode switches and a pair of speed responsive switches connected between a battery and the solenoid of a front wheel drive clutch control valve. The system engages the clutch when vehicle speed is above a limit speed and both service brakes are applied even when the mode switches are in their "OFF" position wherein the clutch is normally disengaged.

13 Claims, 2 Drawing Sheets

FRONT WHEEL DRIVE CLUTCH CONTROL SYSTEM

BACKGROUND OF THE INVENTION

This invention relates to a drive and brake system for a vehicle having a constantly driven rear axle and a front axle controllably driven via an engageable and disengageable front wheel drive clutch.

In one commercially available tractor, it is known to provide a control system which automatically engages its 4-wheel drive when braking and which automatically disengages the 4-wheel drive when the tractor ground speed is greater than 9 miles per hour. However, this known control system does not automatically disengage the 4-wheel drive when only one of the left and right brakes is applied. This is undesirable because when operating an agricultural tractor, it is often advantageous to use only one of the left or right foot brakes to assist in steering the tractor through a headland turnaround. Having the 4-wheel drive engaged during such a brake-assisted steering operation interferes with such turning in that more brake effort is required and front tire pushing, skidding and wear is increased.

From published German patent DE No. 2,946,477, it is known to engage a front-wheel drive clutch which transmits power to a front axle when service brakes for the rear axle are applied. Thus, in this system, it appears that the front wheel drive can interfere with brake-assisted steering because there is no suggestion that the front wheel drive is not engaged when only the left or the right wheel brake is applied. In one embodiment described in DE No. 2,946,477, a solenoid-operated valve controls a pressure-operated front wheel drive clutch and the solenoid energization is controlled by a brake-responsive switch. However, the system of DE No. 2,946,477 requires a distributor valve hydraulically coupled to left and right brake cylinders and a piston hydraulically connected to the distributor valve and mechanically connected to the brake-responsive switch. Thus, such a system requires expensive hydraulic components which rob hydraulic fluid that might be needed for emergency braking.

U.S. Pat. No. 4,811,811 issued March 4, 1989 and U.S. Pat. No. 4,878,559, issued Nov. 7, 1989, both assigned to the assignee of the present application describe control systems which control the engagement and disengagement of a tractor front wheel drive clutch as a function of vehicle speed and as a function of an "AUTO-ON-OFF" operator controlled mode switch.

In one of the control systems disclosed in these references, even though the mode control switch is in the "OFF" mode, the clutch engagement will vary as a function of brake application at both high and low speeds. In the other control systems disclosed therein, when the mode control switch is in the "OFF" mode, the clutch will be disengaged regardless of vehicle speed or brake application. It is desired to have such a control system with an "OFF" mode wherein the clutch is always disengaged at low vehicle speeds, but wherein four wheel braking would be available at high vehicle speeds

SUMMARY OF THE INVENTION

An object of the present invention is to provide a control system with a manually operated on, off, auto mode control switch wherein the front wheel drive clutch is engaged even when the mode control switch is in its off position when both left and right service brakes are applied and a limit speed is exceeded.

This and other objects are achieved by the present invention which includes three brake-operated switches which are connected to left and right service brake pedals so that depressing a brake pedal to apply a service brake operates one or two of the switches. A manually operated switch is mounted on the console of the vehicle operator's compartment. In one embodiment, a pair of speed responsive switches are operated by a relay connected to a vehicle speed sensor. One of the speed responsive switches is connected between the battery and the brake operated switches. The other speed-responsive switch is connected to the battery, the brake-operated switches and the operator-controlled switch. The clutch control valve controls the fluid pressure in a spring-engaged pressure-released front wheel drive clutch between the vehicle transmission and the front axle.

Another embodiment includes a latching relay coupled to the other speed responsive switch so that the clutch engages when both brakes are applied when the vehicle is above the limit speed and remains engaged as the vehicle speed drops below the limit as long as both brakes remain applied. When the brakes are released the latching relay is released and the clutch will remain disengaged as long as vehicle speed remains below the limit speed.

DETAILED DESCRIPTION

Figure 1:
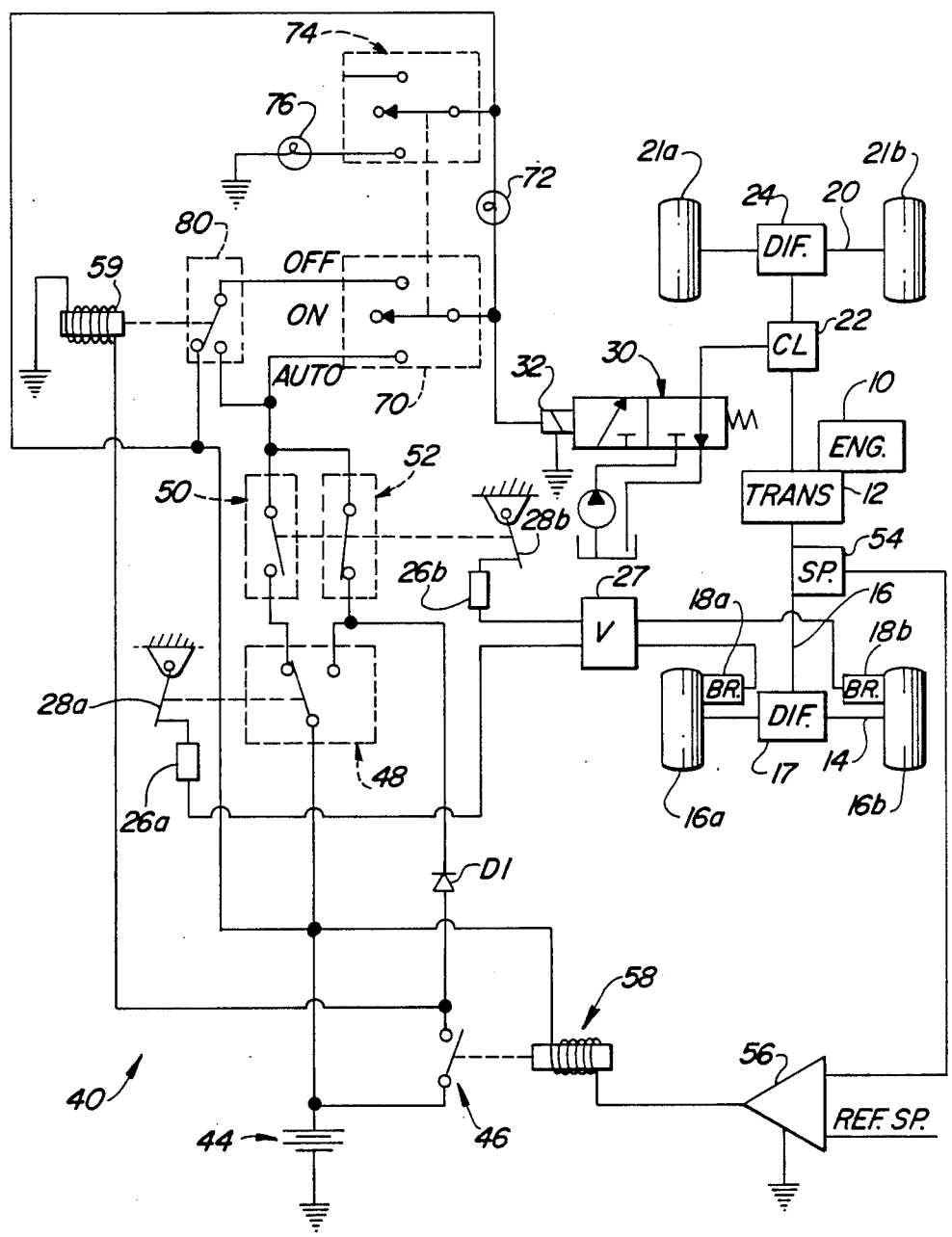
FIG. 1 is a schematic diagram of a front wheel drive clutch control system constructed according to the present invention.

Referring to FIG. 1, a vehicle, such as a tractor, includes an engine 10 which drives a transmission 12. The transmission drives a rear axle 14 via shaft 16 and differential 17. The rear axle 14 supports a pair of rear driving wheels 16a, 16b, each with a corresponding service brake 18a, 18b. The engine also drives a front axle 20 and front wheels 21a, 21b via a pressure-operated clutch 22 and differential 24. The service brake 18a, 18b are fluid-operated by conventional master cylinders 26a, 26b, each connected to a corresponding brake pedal 28a, 28b via a conventional brake equalization valve 27.

The clutch 22 is preferable a known spring-engaged, pressure-released clutch such as described in DE No. 2,946,477. The pressure in clutch 22 is controlled by a valve or actuator 2. 30 which is actuated by a solenoid 32, so that the clutch 22 is disengaged when solenoid 32 is energized and clutch 22 is engaged when solenoid 32 is de-energized.

A control circuit 40 controls energization of the solenoid 32. Control circuit 40 includes brake-operated switches 48, 50 and 52 and solenoid-operated switches 46 and 80. Switch 48 includes a first terminal connected to the battery or potential source 44, second and third terminals and a switch element operatively connected to left brake pedal 28a so that when pedal 28a is released, the first terminal is connected to the second terminal and when pedal 28a is depressed, the first terminal is connected to the third terminal.

Normally open brake operated switch 50 has a first terminal connected to the second terminal of the brake-operated switch 48, a second terminal and a switch element operatively connected to the right brake pedal 28b so that switch 50 is open when pedal 28b is released and closed when pedal 28b is depressed.

A normally closed brake operated switch 52 includes a first terminal connected to the third terminal to switch 48 and connected to battery 44 via diode D1 and switch 46, a second terminal and a switch element operatively connected to right brake pedal 28b so that switch 52 is closed when pedal 28b is released and open when pedal 28b is depressed.

A speed sensor 54 senses the speed of the vehicle and provides a signal representative thereof to comparison circuit 56. Relay coil 58 has one side connected to the battery 44 and another side connected to the output of comparison circuit 56. Comparison circuit 56 may include a conventional comparator and amplifier connected so as to energize coil 58 and close relay switch 46 only when the vehicle speed exceeds a predetermined speed.

A first operator-controlled switch 70 includes a first terminal connected to the solenoid 32 and to one side of an indicator lamp 72, a second terminal connected to the second terminal of switches 50 and 52, an unconnected third terminal, a fourth terminal and a switch element movable to connect the first terminal with any one of the second, third or fourth terminals.

A second operator-controlled switch 74 includes a first terminal connected to the other side of lamp 72 and to battery 44, a second terminal connected to ground via indicator lamp 76, unconnected third and fourth terminals, and a switch element ganged with the switch element of switch 70 and movable to connect its first terminal with any one of its second, third or fourth terminals.

A second relay coil 59 is connected to battery 44 via switch 46 so that the closing of speed responsive switch 46 energizes coil 59. Second coil 59 operates a second speed responsive switch 80. Switch 80 includes a first terminal connected to the fourth terminal of switch 70, a second terminal connected to battery 44, to lamp 77 and to the first terminal of switch 74, a third terminal connected to the second terminal of switch 70 and to the second terminals of switches 50 and 52, and a switch element normally connecting its first and second terminals, but connecting its first and third terminals when coil 59 is energized. Diode D1 has a cathode connected to switches 48 and 52 and an anode connected to switch 46 and to coil 59 and prevents energization of coil 59 merely as a result of the operation of switch 48.

Figure 2:
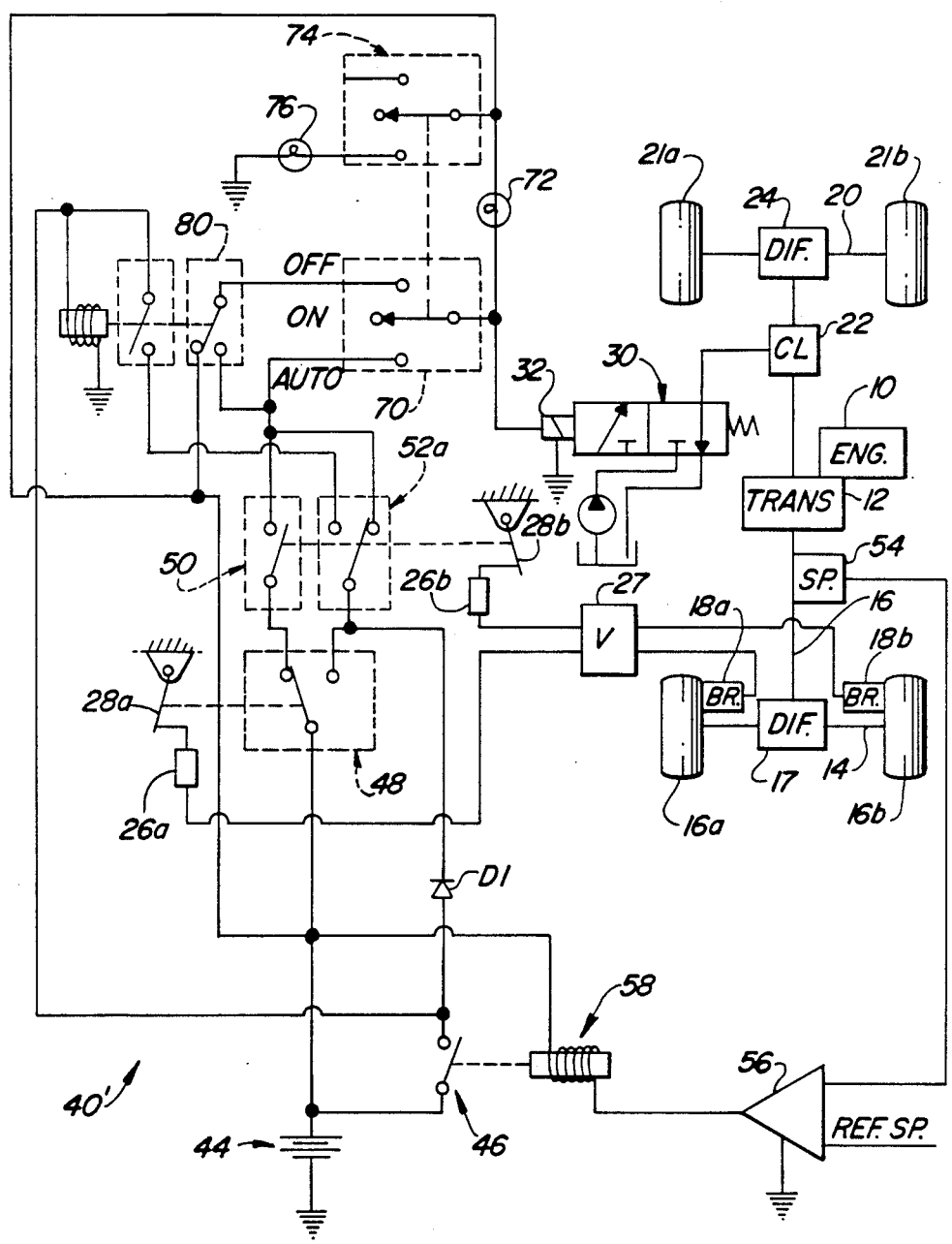
FIG. 2 is a schematic diagram of an alternative embodiment of the present invention.

Referring now to FIG. 2, the circuit 40' shown therein is similar to that shown in FIG. 1, and only the additional or changed elements will be described herein. The FIG. 2 circuit includes a third speed responsive switch 82 with a first terminal connected to the battery 44 via switch 46 and to one side of second relay coil 59, a second terminal, and a switch element ganged together with the switch element of switch 80. Switch 82 is open when coil 59 is de-energized and closed when coil 59 is energized.

Switch 52 is replaced by switch 52a which is similar to switch 52, but includes a third terminal connected to the second terminal of switch 82. The switch element of switch 52a connects its first and second terminals when brake 28b is released and connects its first and third terminals when brake 28b is applied.

Mode of Operation

Referring to FIG. 1, when the switch 70 is in the "AUTO" position, the circuit 40 operates to engage the clutch 22 when both brake pedals are depressed and to disengage the clutch 22 when either one or the other, but not both, of pedals 28a, 28b are depressed. When both pedals 28a, 28b are released, the clutch 22 will be engaged, except when the vehicle speed exceeds a certain speed of, for example, 9 mph, then relay switch 46 closes, thus energizing solenoid 32 and disengaging clutch 22.

With switch 70 in the "OFF" position and vehicle speed below 9 mph so that switches 46 and 80 are in the position shown, solenoid 32 will be energized via switches 80 and 72 and the clutch 22 will be disengaged, regardless of the operation of brake pedals 28a or 28b. However, when vehicle speed exceeds 9 mph (for example), then switch 80 will connect switches 50 and 52 to solenoid 32 and switch 46 will connect switch 52 to battery 44 so that the clutch 22 will be disengaged when both brakes are released and when only one brake is applied. However, when both brakes are applied, switches 48–52 operate to de-energize solenoid 32 and engage clutch 22. This assures that additional four wheel drive braking capability is available at high vehicle speeds regardless of the setting of the switch 70, but assures that the clutch 22 will be disengaged at low speeds when switch 70 is in its "OFF" position.

The operation of the circuit of FIG. 2 is similar to that of FIG. 1, except that switch 82 and coil 59 cooperate as a latching relay so that (when switch 70 is in its "OFF" position) the clutch 22 engages when both brakes are applied when vehicle speed is above the limit speed and remains engaged as the vehicle speed drops below the limit speed as long as both brakes remain applied. This is because coil 59 will be connected to the battery 44 via switches 48, 52a and 82 when both brakes are applied and thus, the energization of coil 59 will be unaffected when switch 46 opens as the vehicle speed drops below the limit speed.

However, when one or both brakes are released, then the clutch 22 will be disengaged and coil 59 will be de-energized allowing switches 80 and 82 to return to the positions shown in FIG. 2. Thus, reapplication of both brakes will not reengage clutch 22 as long as vehicle speed remains below the limit speed.

While the invention has been described in conjunction with a specific embodiment, it is to be understood that many alternatives, modifications and variations will be apparently to those skilled in the art in light of the aforegoing description. For example, the various normally closed or normally open switches could be replaced with the opposite type of switches and the solenoid operated clutch control valve could be replaced by a valve wherein clutch engagement results from solenoid energization, rather than from solenoid de-energization. Also, the unique functional logic of the present invention could be performed by a solid state logic circuit or by a microprocessor programmed to perform the logic performed by the switching circuit disclosed herein. Accordingly, this invention is intended to embrace all such alternatives, modifications and variations which fall within the spirit and scope of the appended claims.

We claim:

1. In a vehicle having a primary axle driven by an engine via a transmission, first and second drive wheels on the primary axle, first and second service brakes for braking the respective first and second drive wheels, a secondary axle supporting a pair of secondary wheels, a clutch between the engine and the secondary axle, a clutch control means for controlling engagement and disengagement of the clutch, the clutch control means comprising:

a speed sensor for sensing speed of the vehicle;

a brake switch unit having a plurality of switches operatively coupled to the service brakes;

an operator-controlled mode switch having an OFF position operable to disengage the clutch during certain conditions; and means coupled to the speed sensor, the switch unit and the mode switch for disengaging the clutch regardless of brake application if the mode switch is in its off position and the vehicle speed is below a limit speed and for engaging the clutch if the mode switch is in the OFF position when the vehicle speed is above the limit speed and both service brakes are applied.

2. The invention of claim 1, wherein the clutch control means comprises:

an actuator for engaging and disengaging the clutch as a function of a potential applied to an input of the actuator, the mode switch being connected to the actuator;

a potential source;

a first speed-responsive switch connected between the potential source and the brake switch unit and operatively coupled to the speed sensor; and the second speed-responsive switch connected between the potential source, the brake switch unit and the mode switch and operatively coupled to the speed sensor.

3. The invention of claim 2, wherein;

the mode switch comprises a first terminal connected to the actuator, a second terminal connected to the brake switch unit, a third terminal, a fourth terminal, and a switch element movable to a first position interconnecting the first and second terminals, to a second position interconnecting the first and third terminals, and to a third position interconnecting the first and third terminals, and to a third position interconnecting the first and fourth terminals; and the second speed-responsive switch comprises a first terminal connected to the fourth terminal of the mode switch, a second terminal connected to the potential source, a third terminal connected to the brake switch unit, and a switch element movable from a first position interconnecting the first and second terminals to a second position interconnecting the first and third terminals when vehicle speed exceeds the limit speed.

4. The invention of claim 3, wherein:

the second speed-responsive switch comprises a relay coil operatively coupled to its switch element, the first speed-responsive switch being connected between the potential source and one side of the relay coil, actuation of the first speed-responsive switch energizing the relay coil and actuating the switch element of the second speed-responsive switch.

5. The invention of claim 4, further comprising:

a diode having a cathode connected to the brake switch unit and an anode connected to the one side of the relay coil and to the first speed-responsive switch, the diode preventing operation of the brake switch unit from initially energizing the relay coil.

6. The invention of claim 2, wherein:

a latching relay is coupled to the second speed responsive switch and to the brake switch unit, the latching relay, brake switch unit and the mode switch cooperating when the mode switch is in its OFF position to maintain engagement of the clutch when both service brakes are applied as the vehicle speed changes from above to below the limit speed.

7. The invention of claim 6, wherein the latching relay comprises:

a relay coil connected to the potential source via the first speed-responsive switch; and a relay switch having a first terminal connected to the relay coil and the potential source via the first speed-responsive switch, a second terminal connected to the brake switch unit and a switch element operatively coupled to the relay coil and to the second speed-responsive switch.

8. The invention of claim 2, wherein the second speed-responsive switch comprises:

a first terminal connected to the mode switch, a second terminal connected to the potential source, a third terminal connected to the brake switch unit, a switch element movable from a first position closing a circuit between the first and second terminals to a second position closing a circuit between the first and third terminals, and a relay coil operatively coupled to the switch element of the second speed-responsive switch, the relay coil also being electrically connected to the first speed-responsive switch.

9. The invention of claim 8, further comprising:

a latching switch having a first terminal connected to the relay coil, a second terminal connected to the brake switch unit and a switch element operatively coupled to the relay coil and to the switch element of the second speed responsive switch, the switch element of the latching switch closing a circuit between its first and second terminals when the switch element of the second speed-responsive switch is in its second position.

10. The invention of claim 7, wherein the brake switch unit comprises:

a first switch having a first terminal connected to the potential source, a second terminal, a third terminal and a switch element operatively connected to the first service brake to close a circuit between the first and second terminals when the first service brake is released and to close a circuit between the first and third terminals when the first service brake is applied;

a second switch having a first terminal connected to one of the second and third terminals of the first switch, a second terminal connected to the actuator via the mode switch and to the second speed-responsive switch and a switch element operatively connected to the second service brake to open a circuit between its terminals when the second service brake is released and to close a circuit between its terminals when the second service brake is applied; and a third switch having a first terminal connected to the other of the second and third terminals of the first switch and to the potential source via the first speed-responsive switch, a second terminal connected to the actuator via the mode switch and to the second speed-responsive switch, a third terminal connected to the second terminal of the relay switch and a switch element operatively connected to the second service brake to close a circuit between its first and second terminals when the second service brake is released and to close a circuit between its first and third terminals when the second service brake is applied.

11. The invention of claim 1, further comprising:
means operative when the mode switch is in its OFF position for maintaining engagement of the clutch when both service brakes are applied and the vehicle speed changes from above to below the limit speed.

12. In a vehicle having a primary axle driven by an engine via a transmission, first and second drive wheels on the primary axle, first and seconde service brakes for braking the respective first and second drive wheels, a secondary axle supporting a pair of secondary wheels, a clutch between the engine and the secondary axle, and a clutch control means for controlling engagement and disengagement of the clutch, the clutch control means comprising:
an actuator for engaging and disengaging the clutch as a function of a potential applied to an input of the actuator;
a potential source;
speed sensor;
a brake switch unit having a plurality of switches operatively coupled to the service brakes;
an operator-controlled mode switch connected to the actuator, the mode switch having a plurality of operator-selected positions including an "OFF" position wherein the clutch is normally disengaged independent of application of the service brakes;
a first speed-responsive switch connected between the potential source and the brake switch unit and operatively coupled to the speed senor; and
a second speed-responsive switch connected between the potential source, the brake switch unit and the mode switch and operatively coupled to the speed sensor, the second speed responsive switch and the brake switch unit cooperating to engage the clutch when vehicle speed exceeds a limit speed and while both service brakes are applied while the mode switch is in its "OFF" position.

13. The invention of claim 12, wherein:
the mode switch comprises a first terminal connected to the actuator, a second terminal connected to the brake switch unit, a third terminal, a fourth terminal, and a switch element movable to a first position interconnecting the first and second terminals, and to a third position interconnecting the first and third terminals; and
the second speed-responsive switch comprises a first terminal connected to the fourth terminal of the mode switch, a second terminal connected to the potential source, a third terminal connected to the brake switch unit, and a switch element movable from a first position interconnecting the first and second terminals to a second position interconnecting the first and third terminals when vehicle speed exceeds the limit speed

* * * * *